Feb. 14, 1961   R. H. AKIN   2,971,433
TRANSISTORIZED PHOTOMULTIPLIER PHOTOMETER CIRCUIT
Filed Jan. 7, 1959   3 Sheets-Sheet 1

INVENTOR.
ROYAL H. AKIN
BY
*Paul H. Critchlow*
ATTORNEYS

INVENTOR.
ROYAL H. AKIN
BY
ATTORNEYS 2,971,433
Patented Feb. 14, 1961

2,971,433

TRANSISTORIZED PHOTOMULTIPLIER PHOTOMETER CIRCUIT

Royal H. Akin, 2285 Meadow Lark Drive, San Diego 11, Calif.

Filed Jan. 7, 1959, Ser. No. 785,538

6 Claims. (Cl. 88—23)

(Granted under Title 35, U.S. Code (1952), sec. 266)

The invention described herein may be manufactured and used by or for the Government of the United States of America for governmental purposes without the payment of any royalties thereon or therefor.

This invention relates to a photometer and more particularly to a portable transistorized photomultiplier photometer, capable of either linear or logarithmic response.

In military search and concealment studies there are many occasions where a photometer is essential. This may take the form of an incident light meter, a spot photometer, or telephotometer. Since most of the studies are out of doors, the range of brightness in any given location may be very great, an example being that of environmental studies at sea on a very bright day. In this case fleecy clouds may be as bright as 8,000 foot lamberts, while the sea viewed vertically may appear nearly black, with a brightness of only 50 foot lamberts. In the prior art, a reliable type of photomultiplier operation is the feedback loop photometer which has been in use for some time. This type of circuit employs two features which are extremely desirable. The first is high sensitivity being limited only by the characteristics of the photomultiplier and the second is the large dynamic range, 5 or 6 log cycles being possible. The output voltage of the circuit approximates the logarithm of the incident light intensity, so that a range of 10,000 or 100,000 may be read on a simple D.C. meter. Unfortunately, considerable weight and power drain are requisite to the older circuits, which limit portability and utility in many cases. Another serious disadvantage of these older types of circuits is that because of the large range of a multilog scale, small brightness differences become difficult to measure.

It is thus an object of the present invention to provide a lightweight portable photometer with both linear and logarithmic modes of operation.

Another object is the provision of a transistorized portable photometer.

A further object of the invention is to provide a portable photometer with a minimum power requirement.

Still another object is to provide a portable photometer capable of push button operation.

A still further object of the present invention is to provide a simple variable frequency blocking oscillator.

Still another object of the present invention is to provide a novel blocking oscillator controlled regulated high voltage power supply.

According to the invention a high voltage rectifier supplies the operating potential for an electron multiplier phototube. In series with the phototube anode is a large resistor which couples the anode to the positive terminal of the rectifier. For logarithmic response, the anode potential is coupled to a controlled amplifier which in turn controls the frequency of a pulse generator. The output of the pulse generator is then amplified and coupled to the input of a high voltage rectifier supplying the primary power. Since the input of the high voltage rectifier is a series of narrow pulses, the output voltage will be dependent upon the frequency of the pulse generator. Since the high voltage will vary approximately with the logarithm of the light intensity impinging upon the phototube, an indication of the amplitude of this voltage can be caliberated directly as a light meter. In the second mode of operation, utilizing the same components, the control voltage is coupled from a divider across the high voltage instead of from the anode of the phototube. Thus the anode current will vary linearly with a change in light intensity impinging upon the phototube and again a meter indicating anode current can be calibrated directly as a light meter. This change of modes can be accomplished through a very simple switching arrangement. All of the stages discussed above save one are transistorized which lends greater portability in size and weight considerations. Also through the use of the two modes of operation a much wider range of readability is achieved.

Other objects and many of the attending advantages of this invention will be readily appreciated as the same becomes better understood by reference to the following detailed description when considered in conjunction with the accompanying drawing in which like reference numerals designate like parts throughout the figures thereof and wherein.

Figure 1:
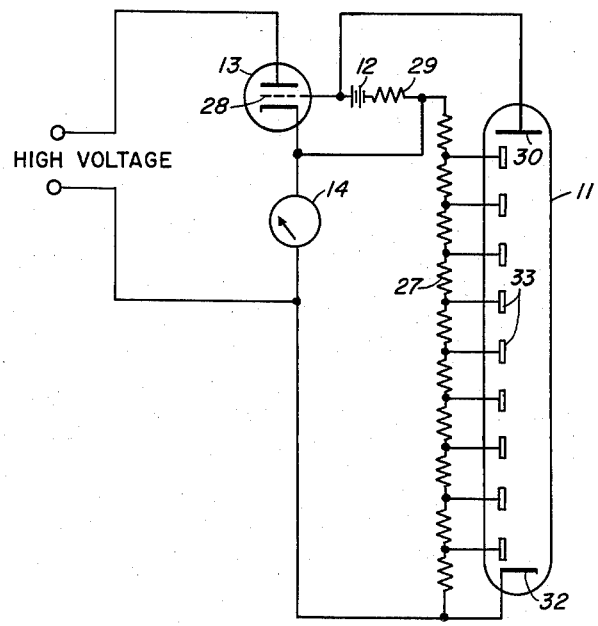
Fig. 1 illustrates the general scheme of the prior art.
Figure 2:
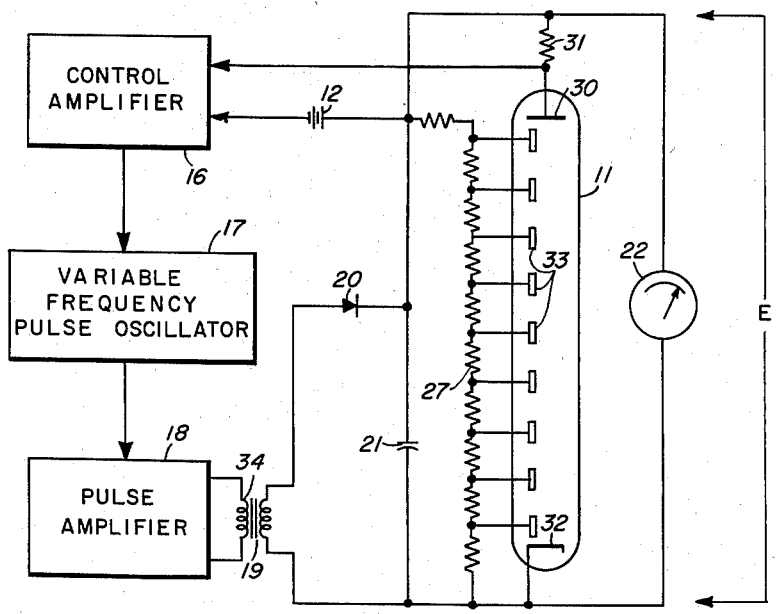
Fig. 2 is a blocked diagram of the present invention when connected in the logarithmic response mode.
Figure 3:
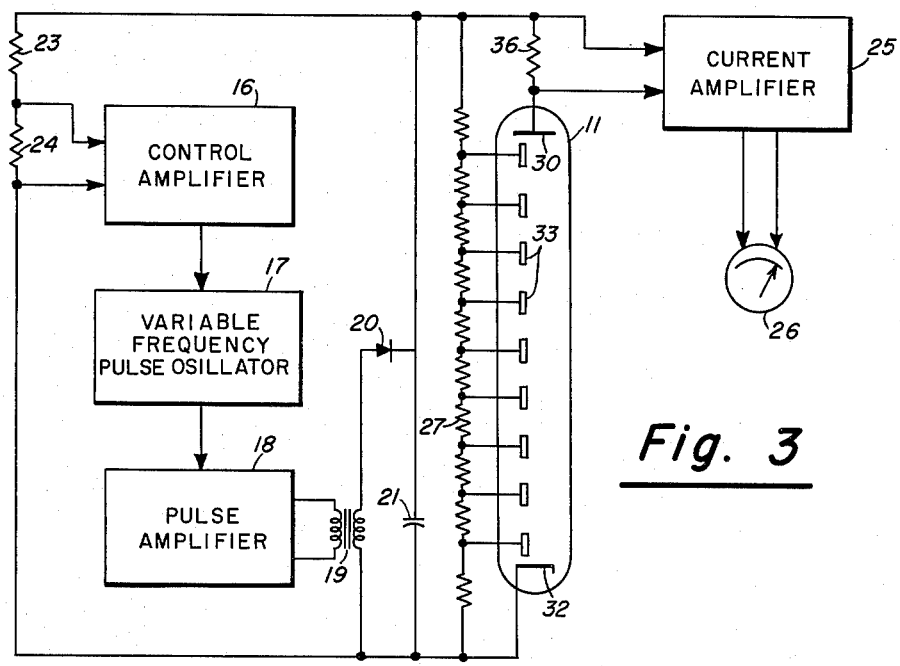
Fig. 3 is a blocked diagram of the present invention when connected in the linear response mode.

Referring now to the drawing Fig. 1 shows a schematic representation of the prior logarithmic photometer. There is shown at 11 a photomultiplier tube utilized in conjunction with reference battery 12, series regulator tube 13 and volt meter 14. Fig. 2 represents the present invention connected for logarithmic response. There is shown a photomultiplier 11 with a reference battery 12 and a feedback loop consisting of control amplifier 16 variable frequency pulse oscillator 17, pulse amplifier 18, a power transformer 19, and high voltage rectifier 20, filter capacitor 21 and meter 22. Referring to Fig. 3 the present invention is shown as connected for linear indications in which there is a photomultiplier 11 associated with a feedback loop consisting of resistors of voltage divider 23, 24, control amplifier 16 variable frequency oscillator 17, pulse amplifier 18, power transformer 19, high voltage rectifier 20, filter capacitor 21. Current amplifier 25 and micro ampmeter 26 serve to indicate variations in anode current and thus the intensity of light impinging on the photomultiplier cathode 32.

Referring in detail to Fig. 1 there is 1500 volts applied across the control tube 13 and its cathode resistor 27. Cathode resistor 27 is also utilized as a voltage divider to supply operating voltages for the electro static focusing secondary emission electrodes 33. Reference battery 12 is connected with its positive terminal to the control grid 28 of control tube 13 and its negative terminal to the cathode resistor 27 through resistor 29. The positive terminal is also connected to anode 30 of photomultiplier tube 11 the cathode of which is connected to the bottom of cathode resistor 27 and the negative terminal of the high voltage power supply. Thus it can be seen that any increase of incident light on the multiplier tube is so amplified as to correspondingly reduce the anode voltage, thus keeping its anode current nearly constant. The cathode voltage of the control tube 13 varies with the potential applied to the grid 28 which is determined by the anode current of photomultiplier 11. The grid voltage is the algebraic sum of the reference battery voltage and the drop across resistor 29 in the anode circuit. Thus an increase in light intensity tends to increase the anode current and reduce the anode voltage. A drop across the sensing resistor 29 is kept opposite and nearly equal to the potential of battery 12 throughout the range. Since the anode current of the multiplier 11 varies as a high exponent of the anode voltage, and it can be shown that if the feedback loop is very tight the voltage across resistors 27 varies nearly as the logarithm of the light flux. For operation from a power line in fixed locations this is a very satisfactory piece of equipment, but a typical unit will contain four rectifier tubes, four voltage regulators, and three vacuum tubes. With the associated components the weight involved is considerable. By use of applicant's invention the disadvantage of high power consumption and heavy weight has been overcome while maintaining the necessary sensitivity and accuracy.

Referring now to Fig. 2 in detail anode 30 of photomultiplier tube 11 is connected through a load resistor 31 to the positive side of high voltage rectifier 20. The negative terminal of the high voltage supply is connected to cathode 32 of the photomultiplier 11. Across the high voltage power supply are connected voltage divider resistors 27 which supply operating potentials for the electro static focusing secondary emissional electrodes 33 and a D.C. metering circuit shown generally at 22, connected also to the anode 30 of photomultiplier tube through resistor 31 is the positive terminal of a reference battery 12 the negative side of which is connected to one input terminal of control amplifier 16. The other input terminal of control amplifier 16 is connected directly to anode 30. The output of the control amplifier is connected to variable frequency pulse oscillator 17 the output of which is amplified in pulse amplifier 18 and coupled as the primary power to power transformer 19 primary winding 34 and to high voltage rectifier 20.

In operation let us assume the variable frequency control blocking oscillator pulse generator 17 is operating at a given frequency in the audio range. Its output consists of a series of sharp pulses of several volts magnitude which is then amplified by pulse amplifier 18. Transformer 19 steps the pulses up to about 1500 volts peak-to-peak, and then they are then rectified by diode rectifier 20. By carefully choosing the values of the filter capacitor 21 the multiplier voltage divider resistors 27, and the pulse width, it is possible to obtain a D.C. voltage proportional to the oscillator repetition rate over at least a five to one range. An added advantage of using pulse techniques is that transistors operate as switches, which conserves battery power and allows the use of smaller transistors since the average internal dissipation is very low in pulse service. Hence, transistors are utilized as much as possible as active elements. Thus, a D.C. voltage of from 300 to 1500 volts dependent upon oscillator frequency is produced and applied to the electrode voltage divider chain 27 of the photomultiplier. In series with the anode 30 of the phototube 11 is a 60 megohm sensing resistor 31. It is the voltage developed across this resistance which is compared with mercury reference battery 12 that supplies a positive or negative correction voltage for control of the variable frequency pulse generator. Because of high internal gain in the feedback control amplifier 16, the voltage drop across the anode resistor is maintained constant within a very small percentage. This results in a constant operation of the phototube which is described for long term calibration accuracy of the tube. Due to the low impedance characteristic of most transistors and the minute anode currents and high resistances involved, a filamentary pentode vacuum tube is used as the first stage of control amplifier 16 after the phototube. Since the high voltage will vary as the logarithm of the light impinging upon the phototube a D.C. meter need only be connected across the high voltage supply to indicate the high voltage, as shown, for a completion of the system.

Figure 4:
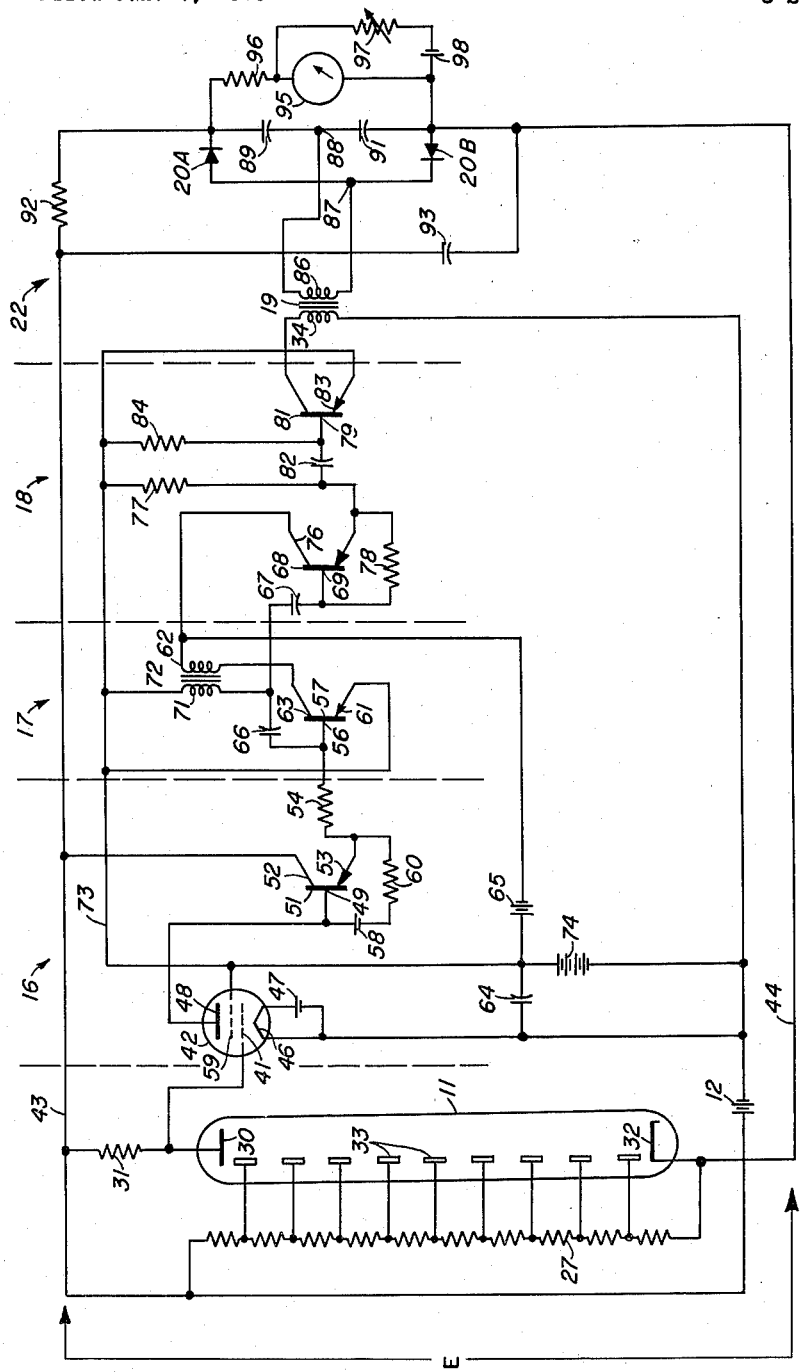
Fig. 4 is a complete schematic diagram of the present invention connected in the logarithmic response mode.

Fig. 3 shows a block diagram of the present invention connected in the linear mode. There is again shown photomultiplier tube 11 connected through a load resistor 36 to the positive side of high voltage rectifier 20. The cathode 32 of the photomultiplier tube is again connected to the negative terminal of high voltage rectifier 20. The anode 30 is coupled to current amplifier 25 the output of which is metered by micro-ampmeter 26. Connected across the power supply terminals are voltage divider resistors 23 and 24, and voltage divider network 27 which supplies operating potentials to the electro static focusing secondary emission electrodes 33. The output of voltage divider 23, 24 is coupled to control amplifier 16 which again controls the frequency of variable frequency pulse generator 17, the output of which is again amplified in amplifier 18 and fed to the primary 34 of transformer 19 as the supply for high voltage rectifier 20. As can be seen, the only difference between the linear and logarithmic mode circuits lies in the metering and feedback arrangements. In the linear arrangement the high voltage is fed back, and the anode current is metered instead of the high voltage. The feedback voltage is again compared with the reference battery voltage and any error minimized by the feedback loop. In essence this becomes a tightly regulated power supply, adjustable by varying the ratio of voltage divider resistors 23 and 24. Five sensitivity ranges can be set by switching the value of voltage divider resistor 24 and thus the anode voltage of photo-multiplier tube 11. Since the multiplier sensitivity varies as approximately the fifth power of the anode potential, the resistor ratio need vary about 5 to 1. In order to reduce the anode current necessary for indication, a transistor amplifier 25 with a current gain of about 20 is used between the multiplier 11 and the micro ammeter 26. A calibrate switch could connect the meter as a volt meter during linear operation so that the power supply can be checked for proper output voltage at this point on the various scales. Since this would require only conventional switching arrangements and is not considered a part of the present invention, it is not illustrated Referring now in detail to Fig. 4 there is shown a schematic diagram of the present invention when switched to the logarithmic response mode. Phototube 11 is shown with its anode 30 connected directly to control grid 41 of amplifier tube 42. Also connected to the phototube anode 30 is a 60 megohm resistor 31 which in turn is connected to a positive high voltage bus 43. The cathode 32 of the phototube is connected to the negative high voltage bus 44. Multiple electrostatic focusing electrodes 33 are connected to voltage divider 27 consisting of 10 390K resistors connected between the positive and negative high voltage power supply buses. A 9 volt mercury reference battery 12 is connected with its positive terminal to the high voltage bus line 43 and its negative terminal to the cathode 46 of tube 42. The filament heater power for tube 42 is supplied by battery 47. Plate 48 of tube 42 is connected directly to the base 49 of transistor 51. Collector 52 of transistor 51 is connected to the positive high voltage bus 43 and emitter 53 is connected through resistor 54 to the base 56 of blocking transistor 57. A bias cell 58 is connected in series with resistor 60 between an emitter 53 and base 49 of transistor 51. The emitter 61 of transistor 57 is connected to screen grid 59 of amplifier tube 42 and to the positive terminal of battery 65 the negative terminal being connected through transformer winding 62 to the collector 63 of transistor 57. Electrolytic capacitor 64 is connected with its negative terminal to the cathode 46 of amplifier tube 42, and positive terminal to the screen grid 59 of amplifier tube 42. The base 56 of transistor 57 is connected through capacitor 66 and capacitor 67 to the base 69 of transistor 68 the junction of capacitor 66 and 67 is connected through winding 71 of transformer 72 to bus 73, which in turn is connected to the positive terminal of battery 74. The collector 76 of transistor 68 is connected directly to the negative terminal of battery 65, the emitter being connected to the positive terminal of battery 61 through resistor 77 and bus 73 and also to the base 69 through resistor 78, and to base 79 of transistor 81 through capacitor 82. Emitter 83 of transistor 81 is connected to bus 73 and to the positive terminal of battery 74, the collector being tied to the negative terminal of battery 74 through winding 34 of transformer 19. The emitter 83 is also connected to the base 79 through resistor 84. Secondary winding 86 of transformer 19h as one terminal 87, connected to the positive side of rectificer 20A and negative side of rectifier 20B and another terminal 88 being connected through capacitor 89 to the negative side of rectifier 20A and through capacitor 91 to the positive side of rectifier 20B. The positive side of rectifier 20B is connected to the negative high voltage bus and the negative side of rectifier 20A is connected through resistor 92 to the positive high voltage bus 43. Capacitor 93 is connected between the positive high voltage bus 43 and the negative high voltage bus 44. D.C. volt micro-ammeter 95 is connected with its negative terminal to the negative high voltage bus and its positive terminal through resistor 96 to the negative terminal of high voltage rectifier 20A. The meter is shunted by rheostat 97 and battery 98 in series.

The operation of the previously described circuit will now be considered. Assume no light is falling on the photo cathode 32 of photomultiplier 11. In this case an infinitely small current will flow in the anode circuit and there will be little or no voltage drop across the 60 megohm load resistor 31. The first amplifier vacuum tube 42 is now rendered conductive by a positive grid voltage with respect to its cathode supplied through load resistor 31 by the mercury reference battery 12. Screen voltage is supplied by battery 74 the positive terminal of which goes directly to the screen 59 and the negative terminal to the cathode 46. The plate supply of tube 42 can be traced through the emitter base circuit of transistor 51 and resistor 54 to the base 56 of transistor 51. Thus the anode supply of the vacuum tube 42 will vary as the blocking oscillator output wave form varies. It should be noted at this point that amplifier 42 is merely utilized as a variable resistance in the discharge circuit of blocking oscillator capacitor 66. Transistor 51 is utilized as an impedance transformer between the high impedance of vacuum tube 42 and the low impedance of the blocking oscillator transistor 57. The transistor 51 is hooked up as a conventional current amplifier. Tube 42 now in conductive state due to the positive bias supplied by the mercury battery 12 will drop very little voltage between cathode and plate, and thus present a low charging discharge resistance for capacitor 66. Battery 58 and resistor 60 form a bias network to hold transistor 51 at cutoff when vacuum tube 42 is not in a conductive state. Resistor 54 is a peak current limiting resistor for the blocking oscillator capacitor discharge. Transformer 72 capacitor 66 and transistor 57 are components of the variable frequency blocking oscillator. The blocking oscillator output at the junction of winding 71 and capacitor 66 is a series of short positive voltage spikes. In this case the varying resistance of vacuum tube 42 can change the repetition rate or frequency from about 200 to about 1500 cycles. When no light falls on cathode 32 of photomultiplier tube 11 it may be seen that the oscillator is then running at its highest frequency. The output of the oscillator is then further amplified by the common collector transistor stage 68 and applied through capacitor 82 to the base 79 of the power transistor 81, which gets its collectors voltage from battery 74. The output of power amplifier 81 is stepped up through transformer 19 to pulses of about 800 volts peak-to-peak. These pulses are applied to positive pulse rectifier 20A, negative pulse rectifier 20B and capacitors 89 and 91 which form a conventional voltage doubler circuit. The rectified voltage is filtered by resistor 92 and capacitor 93. The output of the two rectifiers then appears as a voltage E appearing between the negative high voltage bus 44 and the positive high voltage bus 43. By selecting the values of resistors 27 and 92 and capacitors 89, 91 and 93 it is possible to cause the high voltage E to vary nearly linearly with the repetition rate of the blocking oscillator. The result of a high repetition rate is a high voltage, in this case limited to about 1500 volts. With this high potential a very small amount of light falling on cathode 32 of photomultiplier 11 will produce considerable anode current, which flowing through resistor 32 will overcome the bias battery voltage and begin to cutoff tube 42 and so on through the circuit, the net result being to reduce the oscillator repetition rate or frequency, and thus in turn the high voltage, which falls until the drop across resistor 31 equals the voltage of the reference battery 12. Since the feedback mechanism is self correcting and the internal gain is quite high, the voltage E will always be corrected to maintain a nearly constant photomultiplier anode current as desired. Light flux is now read on the corrected logarithmic scale on meter 95. Dropping resistor 96 is adjusted for proper full scale reading. Battery 98 and resistor 97 are adjusted to provide a bucking voltage for zeroing, since the voltage E drops only to about 300 volts.

For linear operation the grid 41 of amplifier 42 is switched to a divider across the high voltage supply as indicated in Fig. 3, and the meter is switched to the output of a current amplifier in series with the photomultiplier anode also as indicated in Fig. 3. The scale ranges can be adjusted by varying the ratio of the voltage divider resistors. In the interest of simplicity the switching circuits have not been shown since they are conventional and well understood by those skilled in the art.

Figure 5:
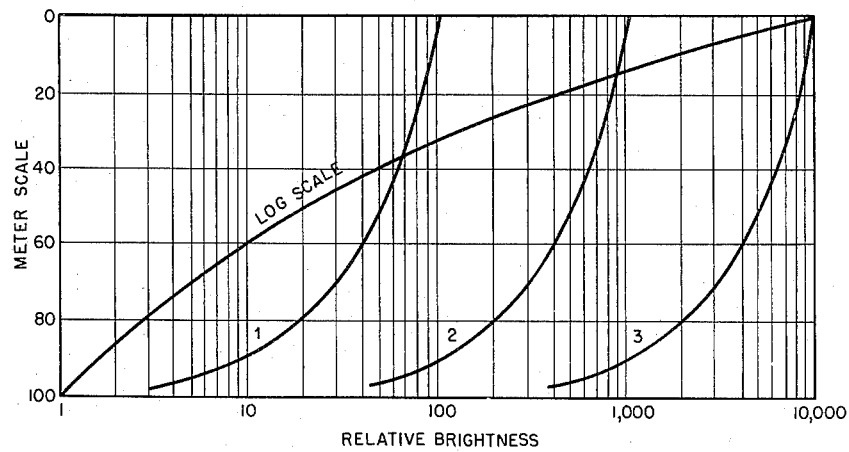
Fig. 5 is a graph showing the meter reading with respect to various light intensities in the two modes with various scales.

Fig. 5 is included to show typical operating currents as measured with the disclosed embodiment of this invention. Since the curves are self explanatory it is not deemed necessary for a detailed explanation.

Thus a light portable transistorized photometer has been disclosed which overcomes the disadvantages present in the prior art photometers. The main power saving method of the present invention is in producing only as much high voltage power as actually needed for the photomultiplier instead of developing a high fixed voltage and dropping it in a series tube common in the prior art exemplified by Fig. 1.

Obviously many modifications and variations of the present invention are possible in the light of the above teachings. For example, vacuum tubes could be utilized in place of transistors in the various stages. Another modification could be the substitution of an increductor-controlled pulse generator for the blocking oscillator. It is therefore to be understood, that within the scope of the appended claims, the invention may be practiced otherwise than as specifically described.

What is claimed is:

1. An electro optical system comprising an electron multiplier phototube provided with an anode, a photocathode and multiple electrostatic focusing secondary emission electrodes, means responsive to variations of phototube anode current resulting from phototube light input variations for varying the amplitude of the voltage across the multiple electrodes, said means including a pulse generator controlled in frequency by said anode current, the output of said pulse generator coupled to the input of a rectifier having positive and negative output terminals and connected to supply the operating potentials on said phototube.

2. The system of claim 1 including anode current indicating means.

3. The system of claim 2 wherein said current indicating means comprises a load resistor connected between said anode and the anode supply, a current amplifier having an input coupled to said anode and an output connected to a current amplitude responsive means.

4. The system of claim 1 wherein said first mentioned means further comprises a resistor connected between said anode and the positive rectifier output terminal, said anode connected to a control means the resistance of which varies as a function of the applied potential, and said pulse generator consists of a blocking oscillator provided with a blocking capacitor, said control means connected as a variable charging resistance in said blocking oscillator, whereby said rectifier output varies as the logarithm of the light intensity impinging on said phototube cathode.

5. The system of claim 4 wherein said control means comprises a D.C. amplifier connected in series with the blocking oscillator blocking capacitor.

6. The system of claim 5 wherein said D.C. amplifier comprises a first vacuum tube stage and a transistor stage connected in cascade and said blocking oscillator has a transistor as an active element.

References Cited in the file of this patent

UNITED STATES PATENTS

| | | |
|---|---|---|
| 2,616,048 | Rubin | Oct. 28, 1952 |
| 2,647,436 | Shapiro | Aug. 4, 1953 |
| 2,791,739 | Light | May 7, 1957 |
| 2,862,416 | Doyle | Dec. 2, 1958 |